United States Patent
Rounaghi et al.

(10) Patent No.: US 11,891,497 B2
(45) Date of Patent: Feb. 6, 2024

(54) MECHANOCHEMICAL SYNTHESIS OF POLYMER-COMPATIBLE ORGANOCLAYS

(71) Applicants: Seyyed Amin Rounaghi, Birjand (IR); Elaheh Esmaeili, Birjand (IR)

(72) Inventors: Seyyed Amin Rounaghi, Birjand (IR); Elaheh Esmaeili, Birjand (IR)

( * ) Notice: Subject to any disclaimer, the term of this patent is extended or adjusted under 35 U.S.C. 154(b) by 501 days.

(21) Appl. No.: 17/124,235

(22) Filed: Dec. 16, 2020

(65) Prior Publication Data

US 2021/0115227 A1  Apr. 22, 2021

Related U.S. Application Data

(60) Provisional application No. 62/948,832, filed on Dec. 17, 2019.

(51) Int. Cl.
| | |
|---|---|
| *C08K 9/08* | (2006.01) |
| *C09C 1/42* | (2006.01) |
| *C08K 3/34* | (2006.01) |
| *C08L 19/00* | (2006.01) |
| *C08J 3/22* | (2006.01) |
| *B60C 1/00* | (2006.01) |
| *C08J 3/20* | (2006.01) |

(52) U.S. Cl.
CPC .............. *C08K 9/08* (2013.01); *B60C 1/0008* (2013.01); *C08J 3/203* (2013.01); *C08J 3/226* (2013.01); *C08K 3/346* (2013.01); *C08L 19/00* (2013.01); *C09C 1/42* (2013.01); *C08L 2205/035* (2013.01); *C08L 2207/24* (2013.01); *C08L 2310/00* (2013.01)

(58) Field of Classification Search
CPC ........ C08K 9/08; C08K 3/346; B60C 1/0008; C08J 3/303; C08J 3/226; C08L 19/00; C08L 2205/035; C08L 2207/24; C08L 2310/00; C09C 1/42
See application file for complete search history.

(56) References Cited

U.S. PATENT DOCUMENTS

2006/0128867 A1* 6/2006 Marx ................. C08J 5/005
524/445
2006/0235128 A1* 10/2006 Wang ................. C09C 1/42
524/502

\* cited by examiner

*Primary Examiner* — Edward J Cain
(74) *Attorney, Agent, or Firm* — Bajwa IP Law Firm; Haris Zaheer Bajwa (57) ABSTRACT

A method for producing a clay/polymer composite may include choosing an intercalating agent from among organic constituents of a polymer matrix, forming a polymer-compatible organoclay by mixing and milling an intercalating agent with a clay, and adding a polymer-compatible organoclay to a polymer matrix.

16 Claims, 8 Drawing Sheets

FIG. 6 ized

MECHANOCHEMICAL SYNTHESIS OF POLYMER-COMPATIBLE ORGANOCLAYS

CROSS-REFERENCE TO RELATED APPLICATION

This application claims the benefit of priority from U.S. Provisional Patent Application Ser. No. 62/948,832, filed on Dec. 17, 2019, and entitled "MECHANOCHEMICAL SYNTHESIS OF POLYMER-COMPATIBLE ORGANOCLAYS" which is incorporated herein by reference in its entirety.

TECHNICAL FIELD

The present disclosure relates to organoclays and more particularly relates to mechanochemical synthesis of polymer-compatible organoclays.

BACKGROUND

Bentonite is a kind of clay generated from alteration of volcanic ashes and mainly consists of smectite minerals, such as montmorillonites. Bentonites may contain different minerals in addition to montmorillonites, such as feldspar, calcite, gypsum, and quartz. Superior properties of bentonite such as water absorption, viscosity, thixotropy, and swelling make bentonite a promising material for a wide range of applications. For example, bentonite may be utilized as an emulsifying, thixotropic, and lubricating agent in civil engineering, skin treatment, and agriculture. Despite these superior properties, bentonite is an inorganic material with a low interaction with organic media which limits the application of bentonite in polymer compositions. Such low interaction of bentonite with organic media may be eliminated by producing organoclays.

Wet chemical and dry mechanochemical methods may be used for producing organoclays. In a wet chemical method, clay may interact with a water-soluble onium base according to its cation exchange capacity where the common onium base may include ammonium, phosphonium, sulfonium, arsonium, stibonium, oxonium, etc. Processing limitations, environmental and economic issues are three main drawbacks of wet chemical methods. In a wet chemical method, intercalating agents are limited to water-soluble organic compounds, most of water-soluble organic compounds are hazardous for the environment. The other problem of a wet chemical method may be an incomplete cation exchange process during the synthesis of organoclays. As a result, organic wastes may remain in the environment due to the incomplete reaction, which in turn, may increase the environmental pollution and the production cost. Another drawback of a wet chemical method may be the consumption of a large amount of water and energy in filtration, drying, and grinding steps.

To overcome the aforementioned shortcomings of a wet chemical method, a dry mechanochemical method may be developed in which the reaction energy is provided by the mechanical ball impacts. In a dry mechanochemical method, reagents may be added to a grinder such as a ball mill and then the reaction may proceed in a dry medium. Although, a dry mechanochemical method may use a dry medium to accomplish the reaction, when onium derivatives are used as intercalating agents, 15 vol. % to 25 vol. % water is required for a cation exchange reaction and the organoclay preparation. Consequently, a dry mechanochemical method used for intercalating clays by onium derivatives, requires subsequent drying and crushing processes after the ball milling step.

Organic quaternary ammonium salts may also be utilized as intercalating agents in synthesis of an organoclay by a dry mechanochemical method. The organoclay synthesis using organic quaternary ammonium salts requires high pressure and temperature for melting the organic quaternary ammonium salts. The application of high pressure and temperature in the reaction medium leads to the intercalation of the organic quaternary ammonium salts into the interlayer spaces of the clays and formation of organoclays. Organic quaternary ammonium salts may include at least one of aliphatic alkylamine salts, aromatic amine salts, and basic organic compounds having a pyridine nucleus. Although using organic quaternary ammonium salts as intercalating agents may eliminate water usage, using organic quaternary ammonium salts as intercalating agents may impose extra costs on the system for the utilization of heat and pressure during the intercalation process and limit the industrial applications of the final product. Organoclays modified by organic quaternary ammonium salts show low thermal stability, poor chemical bonding with polymer matrices, low mechanical properties, and increased hysteresis. Furthermore, when organoclays modified by alkyl ammonium compounds are added in a rubber compound, they may disrupt rubber vulcanization.

There is, therefore, a need for a new class of organoclays that may be modified by polymer-compatible intercalating agents. There is further a need for a solvent-free, eco-friendly, and cost-effective mechanochemical process for production of such polymer-compatible organoclays.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a method for producing a clay/polymer composite. An exemplary method may include adding a clay to a polymer matrix, choosing an intercalating agent from among organic constituents of an exemplary polymer, forming a polymer-compatible organoclay by mixing and milling an exemplary intercalating agent with an exemplary clay. An exemplary method for producing a clay/polymer composite may further include adding an exemplary polymer-compatible organoclay to an exemplary polymer matrix.

In an exemplary embodiment, forming an exemplary polymer-compatible organoclay may include mixing and milling an exemplary clay powder and an exemplary intercalating agent with a weight ratio of between 1:0.42 and 1:0.66 (clay powder:intercalating agent).

In an exemplary embodiment, forming an exemplary polymer-compatible organoclay may include mixing and milling an exemplary clay and an exemplary intercalating agent into a fine powder with an average particle size between 0.2 μm and 10 μm.

In an exemplary embodiment mixing and milling an exemplary clay and an exemplary intercalating agent may include solvent-free ball milling a clay/intercalating agent mixture including an exemplary clay and an exemplary intercalating agent utilizing a ball mill. In an exemplary embodiment, an exemplary ball mill may include a plurality of balls, in which a weight ratio of an exemplary clay/intercalating agent mixture to an exemplary plurality of balls may be between 1:15 and 1:30 (clay/intercalating agent mixture:plurality of balls).

In an exemplary embodiment, solvent-free ball milling an exemplary clay/intercalating agent mixture may include milling an exemplary clay/intercalating agent mixture in an exemplary ball mill for a time period between 4 hours and 36 hours.

In an exemplary embodiment, solvent-free ball milling an exemplary clay/intercalating agent mixture may include milling an exemplary clay/intercalating agent mixture in an exemplary ball mill. An exemplary ball mill may include a rotating ball mill rotating at a rotational speed between 60 rpm and 250 rpm.

In an exemplary embodiment, solvent-free ball milling an exemplary clay/intercalating agent mixture may include milling an exemplary clay/intercalating agent mixture into a fine powder with an average particle size between 0.2 µm and 10 µm.

In an exemplary embodiment, choosing an exemplary intercalating agent from among exemplary constituents of an exemplary polymer matrix may include choosing colophony as an exemplary intercalating agent.

In an exemplary embodiment, forming a polymer-compatible organoclay may include mixing and milling an exemplary intercalating agent and an exemplary clay. In an exemplary embodiment, an exemplary clay may include bentonite.

In an exemplary embodiment, adding an exemplary polymer-compatible organoclay to an exemplary polymer matrix may include forming a masterbatch by mixing an exemplary polymer-compatible organoclay and exemplary constituents of an exemplary polymer matrix. In an exemplary embodiment, adding an exemplary polymer-compatible organoclay to an exemplary polymer matrix may further include mixing a vulcanizing agent with an exemplary masterbatch. In an exemplary embodiment, adding an exemplary polymer-compatible organoclay to an exemplary polymer matrix may further include curing an exemplary mixture of an exemplary vulcanizing agent and an exemplary masterbatch.

In an exemplary embodiment, mixing an exemplary polymer-compatible organoclay and exemplary constituents of an exemplary polymer matrix may include mixing an exemplary polymer-compatible organoclay and exemplary constituents of an exemplary polymer matrix with an exemplary polymer-compatible organoclay concentration between 3 and 5 parts per hundred rubber (PHR).

In an exemplary embodiment, curing an exemplary vulcanizing agent and an exemplary masterbatch may include heating an exemplary mixture of an exemplary vulcanizing agent and an exemplary masterbatch at a temperature of 145° C. to 185° C. and under a pressure of 100 bar to 120 bar for 10 minutes to 30 minutes.

In an exemplary embodiment, mixing an exemplary vulcanizing agent with an exemplary masterbatch may include mixing sulfur, peroxides, metal oxides, acetoxy silane, and urethane crosslinkers as an exemplary vulcanizing agent with an exemplary masterbatch.

In an exemplary embodiment, an organoclay may include bentonite powder and an intercalating agent. An exemplary intercalating agent may include colophony in which a weight ratio of an exemplary bentonite powder to an exemplary intercalating agent may be between 1:0.42 and 1:0.66 (bentonite powder:intercalating agent).

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

The novel features which are believed to be characteristic of the present disclosure, as to its structure, organization, use and method of operation, together with further objectives and advantages thereof, will be better understood from the following discussion.

According to one or more exemplary embodiments, the present disclosure is directed to a new class of organoclays that may be compatible with polymer matrices, into which these organoclays are to be added. In other words, the present disclosure is directed to exemplary embodiments of a polymer-compatible organoclay, in which organic ingredients of a polymer compound may be utilized as an intercalating agent. Since organic ingredients that are used in polymer composites are fully compatible with the polymer phases of the polymer composites, such organic ingredients may be promising candidates as intercalating agents for synthesizing polymer-compatible organoclays. Accordingly, the present disclosure is further directed to exemplary embodiments of an organoclay/polymer composite that may include a polymer-compatible organoclay added to a polymer matrix. An exemplary polymer-compatible organoclay may include bentonite intercalated by a component selected from among the constituents of the polymer matrix.

According to one or more exemplary embodiments, the present disclosure is further directed to exemplary embodiments of a method for producing organoclays. An exemplary organoclay may be produced by mixing and milling bentonite powder and an intercalating agent into a fine powder. For example, a ball mill may be utilized for milling bentonite powder and an exemplary intercalating agent. An exemplary organoclay may include an exemplary bentonite powder and an exemplary intercalating agent with a weight ratio of 1:0.42 and 1:0.66 (bentonite powder:intercalating agent).

As mentioned before, an exemplary intercalating agent may be chosen from among organic ingredients of an exemplary polymer composite to synthesize a polymer-compatible organoclay. An exemplary polymer-compatible organoclay may be used in films, bottles, containers, and tires. For each of these applications, a polymer-compatible intercalating agent of an exemplary polymer-compatible organoclay may be chosen from among ingredients of the respective film, bottle, container, or tire. For example, when an exemplary organoclay is to be utilized as a component in an inner liner composition of a tire, an exemplary intercalating agent may be chosen from among the organic ingredients of that inner liner composition. An exemplary inner liner composition may include various ingredients, such as natural and synthetic rubbers, tackifiers, fillers, softeners, antioxidants, and vulcanizing agents. Exemplary tackifiers may be low-molecular weight compounds with high glass transition temperature that may be used to increase stickiness of an exemplary final inner liner composition of a tire to the other layers of a tire. Exemplary softeners may be aromatic oils that may allow a tire to better grip to the ground. Exemplary antioxidants may protect tires from environmental factors, such as temperature and oxygen. Exemplary antioxidants may include thiols and amine-based compounds. Exemplary fillers may be used as a reinforcing agent to achieve increased tire strength. Exemplary fillers may include carbon blacks, silicas, silicon-based fillers, metal oxides, and organoclays. Exemplary vulcanizing agents may enhance elasticity and durability of tires and may include sulfur, peroxides, metal oxides, acetoxy silane, and urethane crosslinkers. In an exemplary embodiment, an exemplary intercalating agent for synthesizing an organoclay may be chosen from among the above-mentioned ingredients. For example, an exemplary intercalating agent may be colophony, which is a tackifier that may be utilized in an exemplary inner liner composition of a tire.

In an exemplary embodiment, a polymer-compatible organoclay may be synthesized by mixing and milling bentonite powder and a polymer-compatible intercalating agent in a grinding mechanism, such as a ball mill. An exemplary ball mill may include a rotating or vibrating container and a plurality of balls disposed within the exemplary rotating or vibrating container, where the container may rotate or vibrate to force the balls to impact the bentonite powder and the particles of the polymer-compatible intercalating agent. An exemplary ball mill may include a tumbler ball mill and a planetary ball mill.

According to one or more exemplary embodiments, the present disclosure is further directed to an inner liner composition of a tire that may include a polymer-compatible organoclay, and a method for synthesizing the inner liner tire composition. An exemplary inner liner composition of a tire may be formed by curing a reaction mixture at elevated temperatures between 145° C. and 185° C. and under a pressure between 100 bar and 120 bar. An exemplary reaction mixture may include a mixture of a masterbatch and vulcanizing agents. An exemplary masterbatch may be formed by mixing natural and synthetic rubbers, tackifiers, fillers, softeners, antioxidants, and polymer-compatible organoclays in a mixing chamber. An exemplary mixing chamber may include spinning wings and a chamber to mix materials inside the exemplary mixing chamber.

An exemplary polymer-compatible organoclay may be utilized in an exemplary masterbatch in place of carbon black in a weight ratio between 3 and 5 parts per hundred rubber (PHR). Replacing an exemplary carbon black with an exemplary polymer-compatible organoclay may lower the viscosity of an exemplary final reaction mixture. Decreasing an exemplary viscosity of an exemplary final reaction mixture may enhance processability of an exemplary final inner liner composition of a tire. As used herein, replacing carbon black with an exemplary polymer-compatible organoclay may refer to replacing a partial amount of carbon black, equal with or even more than the amount of the polymer-compatible organoclay.

An exemplary polymer-compatible organoclay may include colophony as an exemplary polymer-compatible intercalating agent. Colophony is a solid form of resin that may be obtained from trees. There are three kinds of colophony that may differ due to their method of recovery, such as gum rosin, wood rosin and tall-oil rosin. Colophony may be produced by heating liquid resin to vaporize volatile liquid terpene components. Exemplary liquid terpene components may include liquids that may be produced by trees and insects. Colophony may be a component of an exemplary final tire composition. Colophony may act as a tacking agent for increasing elongation percentage of an exemplary final tire composition. Utilizing colophony as an exemplary polymer-compatible intercalating agent for producing organoclays may enhance compatibility of an exemplary organoclay in an exemplary final tire composition.

An overall amount of colophony used in an exemplary final inner liner composition of a tire and an exemplary organoclay may be constant. An exemplary overall amount may refer to an amount of colophony used in an exemplary final inner liner composition of a tire and an amount of colophony used in an exemplary organoclay. In other words, an amount of colophony used in producing an exemplary final inner liner composition of a tire may decrease when an amount of colophony used in an exemplary organoclay increases and vice versa.

In an exemplary embodiment, a method for synthesizing a polymer-compatible organoclay may include a step of determining a composition of a polymer matrix, into which the polymer-compatible organoclay is to be added, a step of choosing an intercalating agent from among the components of the determined composition of the polymer matrix, and a step of mixing and milling the chosen intercalating agent with a clay, such as bentonite. In an exemplary embodiment, an exemplary polymer matrix may be the polymer matrix of a tire composition, a bottle composition, or a polymeric film composition. In an exemplary embodiment, the polymer matrix may include various components, such as rubbers, tackifiers, fillers, softeners, and antioxidants. An exemplary polymer-compatible intercalating agent may be chosen from among these rubbers, tackifiers, fillers, softeners, and antioxidants.

Figure 1A:
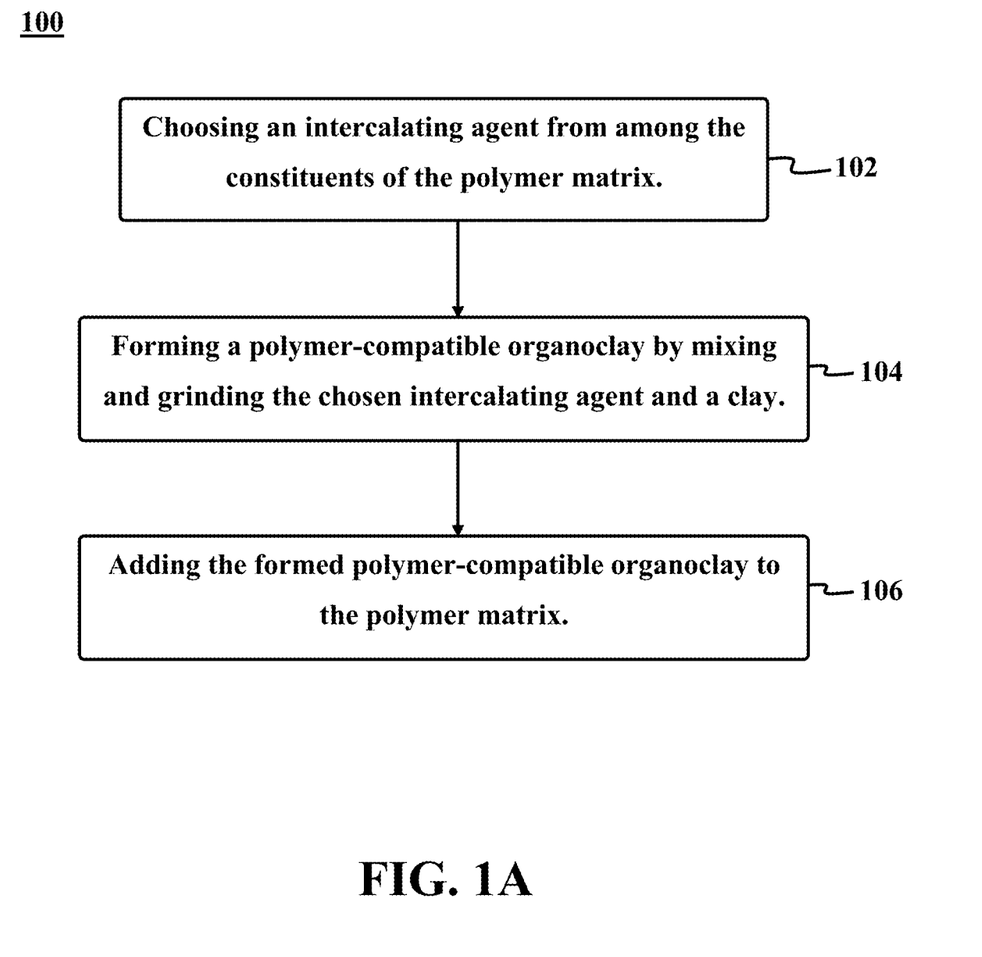
FIG. 1A illustrates a flowchart of a method for mechanochemical synthesis of a polymer-compatible organoclay, consistent with one or more exemplary embodiments of the present disclosure.

FIG. 1A illustrates a flowchart of a method 100 for mechanochemical synthesis of a polymer-compatible organoclay, consistent with one or more exemplary embodiments of the present disclosure. As used herein a clay/polymer composite may refer to a composite in which a clay is added to a polymer matrix. In an exemplary embodiment, method 100 may include a step 102 of choosing an intercalating agent from among the constituents of the polymer matrix, a step 104 of forming a polymer-compatible organoclay by mixing and milling the chosen intercalating agent and a clay, such as bentonite, and a step 106 of adding the formed polymer-compatible organoclay to the polymer matrix.

In an exemplary embodiment, step 102 of choosing the intercalating agent from among the constituents of the polymer matrix may include choosing the intercalating agent from among various components of the polymer matrix, such as rubbers, tackifiers, fillers, softeners, and antioxidants. In an exemplary embodiment, a tackifier of the polymer matrix may be chosen as the intercalating agent, where at least a portion of the tackifier may later be replaced by the polymer-compatible organoclay that is synthesized utilizing the chosen intercalating agent. For example, the polymer-compatible intercalating agent may be colophony.

In an exemplary embodiment, step 104 of forming the polymer-compatible organoclay may include mixing and milling a clay such as bentonite and the chosen intercalating agent in a weight ratio of 1:0.42 to 1:0.66 (bentonite:intercalating agent). In an exemplary embodiment, mixing and milling an exemplary clay and an exemplary polymer-compatible intercalating agent may include pouring the exemplary clay and the exemplary polymer-compatible intercalating agent into a ball mill. An exemplary ball mill may be one of a rotating ball mill and a vibrating ball mill such as a planetary ball mill. In an exemplary ball mill, a plurality of balls may be disposed within a container. An exemplary material that may be grinded may be added into the container and then through rotation or vibration of the container, the plurality of balls may impact the material to be grinded and grind it into a fine powder. In an exemplary ball milling process, an exemplary intercalating agent may be adsorbed on the clay surface and gradually enter the clay galleries to form an exemplary polymer-compatible organoclay. In an exemplary ball mill, two factors may determine the average particle size of the obtained grinded powder, average size of the plurality of balls and the milling time.

Here, milling an exemplary clay and an exemplary polymer-compatible intercalating agent within an exemplary ball mill may allow for the molecules of the exemplary polymer-compatible intercalating agent to be inserted into the clay galleries. As used herein, clay galleries may refer to clay sheets. In an exemplary embodiment, a weight ratio of clay/intercalating agent mixture to an exemplary plurality of balls may be between 1:15 and 1:30 (clay/intercalating agent mixture:balls). In an exemplary embodiment, the clay may be bentonite in powdered form with an average particle size of 75 μm and 150 μm.

In an exemplary embodiment, when a rotating ball mill is utilized, an exemplary clay such as bentonite and an exemplary polymer-compatible intercalating agent such as colophony may be poured into an exemplary ball mill. After that, the exemplary ball mill may be set to rotate at a rotational speed between 40 rpm and 250 rpm and for a time period between 4 hours and 36 hours. An exemplary mixture of an exemplary clay and an exemplary polymer-compatible intercalating agent may be milled into a powder with an average particle size between 0.2 μm and 10 μm. In an exemplary ball mill, the plurality of balls may assume a tumbling motion that may impact solid particles of an exemplary mixture of an exemplary clay and an exemplary polymer-compatible intercalating agent.

Figure 2A:
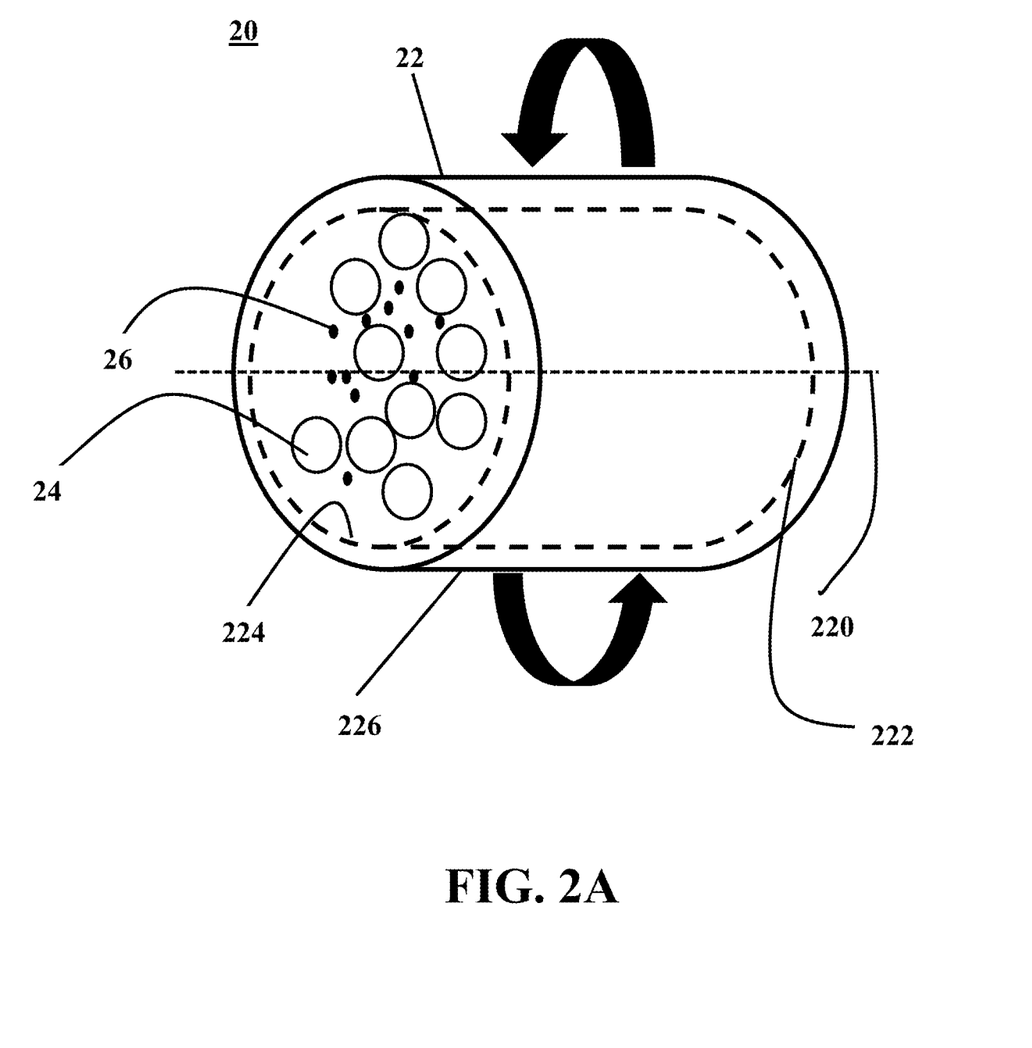
FIG. 2A illustrates a sectional perspective view of a ball mill for synthesizing organoclays, consistent with one or more exemplary embodiments of the present disclosure.
Figure 2B:
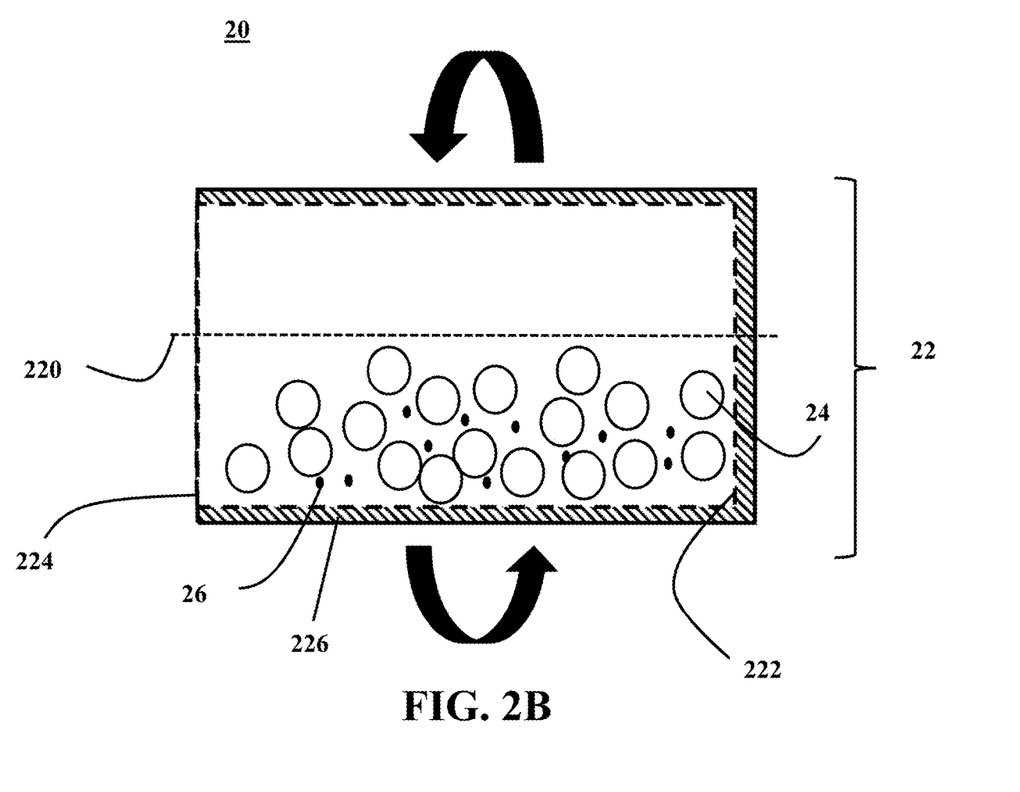
FIG. 2B illustrates a sectional side view of a ball mill for synthesizing organoclays, consistent with one or more exemplary embodiments of the present disclosure.

FIG. 2A illustrates a sectional perspective view of a ball mill 20 that may be utilized in synthesizing exemplary organoclays, consistent with one or more exemplary embodiments of the present disclosure. FIG. 2B illustrates a sectional side view of ball mill 20, consistent with one or more exemplary embodiments of the present disclosure.

In an exemplary embodiment, ball mill 20 may be utilized for performing step 104 of mixing and grinding an exemplary mixture of an exemplary clay and an exemplary polymer-compatible intercalating agent. In an exemplary embodiment, ball mill 20 may include a rotating container 22 and a plurality of balls 24 that may be disposed within rotating container 22. Reaction mixture particles 26 may be added into rotating container 22. In an exemplary embodiment, rotating container 22 may include a base end 222, a top end 224, and a main body 226 that may extend along a longitudinal axis 220 of rotating container 22. As used herein, a longitudinal axis may refer to an axis associated with the longest dimension of an object. For example, rotating container 22 may include a cylinder, where base end 222 may include a circular cross-section and main body 226 may include an annular main body extended along longitudinal axis 220 between base end 222 and top end 224.

As an exemplary ball mill rotates, particles of an exemplary mixture of an exemplary clay and an exemplary polymer-compatible intercalating agent may be trapped and crushed between exemplary balls and between the exemplary balls and a wall of an exemplary container. In an exemplary embodiment, a vibrating ball mill may also be utilized instead of a rotating ball mill. The difference here is that in a vibrating ball mill the impact between the balls and the mixture inside the container is due to the vibration of the container and not the rotational movement of the container.

In an exemplary embodiment, step 106 of adding the formed polymer-compatible organoclay to the polymer matrix may include adding the polymer-compatible organoclay into a masterbatch that is to be utilized for synthesizing the final clay/polymer composite. For example, in an exemplary method for synthesizing an inner liner composition of a tire, an exemplary polymer-compatible clay may be added to a masterbatch and then a vulcanizing agent may be added to the masterbatch. After that, the mixture of the masterbatch and the vulcanizing agent may be cured. Adding clays such as bentonite with 2D structure in a final inner liner composition of a tire may decrease gas permeability. What follows is a description of an exemplary method for synthesizing an inner liner composition of a tire utilizing an exemplary polymer-compatible organoclay. However, an exemplary polymer-compatible organoclay may be utilized for synthesizing a wide range of clay/polymer composites and its application is not limited to inner liner compositions of tires.

Figure 1B:
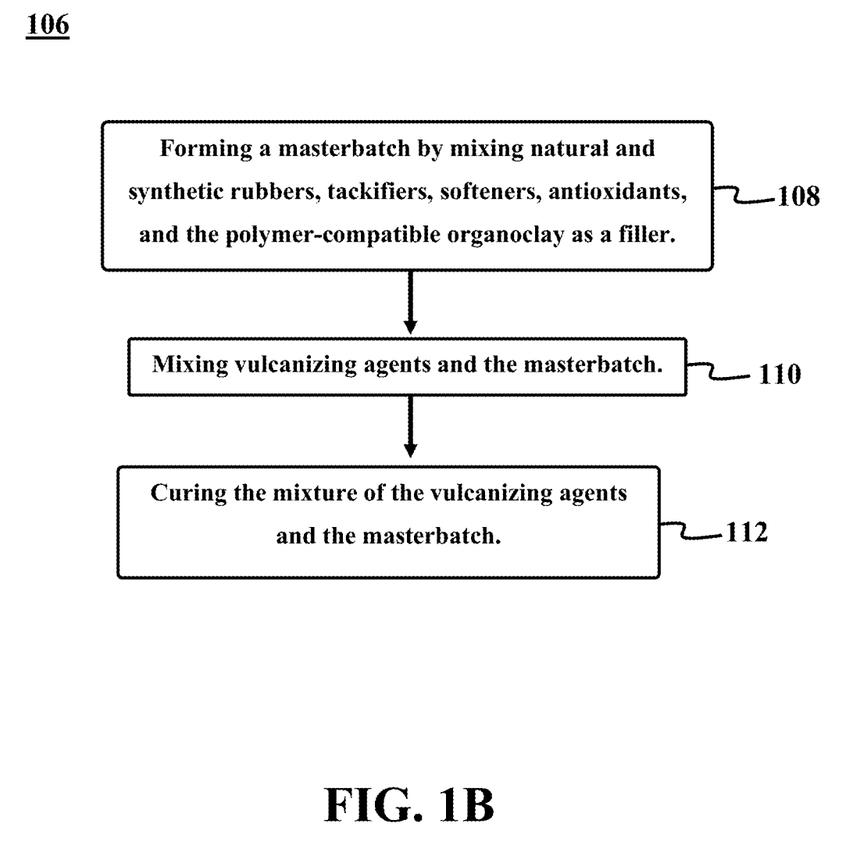
FIG. 1B illustrates a flowchart of a method for utilizing a polymer-compatible organoclay in an inner liner composition of a tire, consistent with one or more exemplary embodiments of the present disclosure.

FIG. 1B illustrates a flowchart of a method for performing step 106 of method 100 to utilize a polymer-compatible organoclay in an inner liner composition of a tire, consistent with one or more exemplary embodiments of the present disclosure. In an exemplary embodiment, step 106 of adding the formed polymer-compatible organoclay to the polymer matrix may include a step 108 of forming a masterbatch by mixing natural and synthetic rubbers, tackifiers, softeners, antioxidants, and the polymer-compatible organoclay as a filler, a step 110 of mixing vulcanizing agents and the masterbatch, and a step 112 of curing the mixture of the vulcanizing agents and the masterbatch.

In an exemplary embodiment, step 108 of forming the masterbatch by mixing natural and synthetic rubbers, tackifiers, softeners, antioxidants, and the organoclay as a filler may include adding natural and synthetic rubbers, tackifiers, an exemplary organoclay, softeners, and antioxidants in a mixing chamber. An exemplary mixing chamber may include spinning wings and a chamber to mix an exemplary masterbatch inside the exemplary mixing chamber. In an exemplary embodiment, an exemplary mixing chamber may include two counter-rotating wings to mix materials inside an exemplary chamber.

In an exemplary embodiment, adding an exemplary organoclay as a filler to an exemplary masterbatch may include adding an exemplary organoclay in place of carbon black at an optimum weight between 3 and 5 PHR. Although carbon black may act as a reinforcing agent in a tire composition, an excess amount of carbon black may deteriorate processability of a tire composition. In an exemplary embodiment, increasing an amount of an exemplary organoclay in an exemplary masterbatch may result in a decrease of carbon black addition and vice versa. For example, when 4 PHR of an exemplary organoclay is used in an exemplary masterbatch, 42.59 PHR of carbon black may be used, but when 7 PHR of an exemplary organoclay is used in an exemplary masterbatch, 39.59 PHR of carbon black may be added. Replacing an exemplary carbon black with an exemplary organoclay may lower viscosity of an exemplary final reaction mixture. Decreasing an exemplary viscosity of an exemplary final reaction mixture may enhance processability of an exemplary final inner liner composition of a tire. An exemplary organoclay may be added as a filler to an exemplary mixing chamber to form an exemplary masterbatch. An exemplary masterbatch may be mixed in an exemplary mixing chamber and discharged at a temperature of 120° C. to 170° C. Afterwards, an exemplary masterbatch may be left for 24 hours to release the internal stresses.

In an exemplary embodiment, step 110 of mixing a vulcanizing agent and the masterbatch may include mixing the vulcanizing agent and the exemplary masterbatch in an exemplary mixing chamber. For example, a mixing chamber may include a chamber equipped with counter-rotating wings. Exemplary counter-rotating wings of an exemplary mixing chamber may rotate and mix the vulcanizing agent and the exemplary masterbatch at a rotational speed between 30 rpm and 70 rpm for 7 minutes and 12 minutes.

In an exemplary embodiment, step 112 of curing the mixture of the vulcanizing agent and the masterbatch may include heating the mixture of the vulcanizing agent and the masterbatch at a temperature of 145° C. to 185° C. and under a pressure of 100 to 120 bar for 10 to 30 minutes. An exemplary produced final inner liner composition of a tire may be left for 24 hours to release internal stresses.

Example 1: Laboratory-Scale Production of Organoclays

In an exemplary embodiment, an organoclay may be produced by forming a reaction mixture using a synthesis method similar to method 100. An exemplary reaction mixture may be obtained by adding 4.1078 g bentonite powder and 1.9196 g colophony in a ball mill such as a planetary ball mill. An exemplary ball mill may contain steel balls with 10 mm diameter. An exemplary organoclay may be produced by adding an exemplary reaction mixture in an exemplary ball mill with a weight ratio of 1:15 and 1:30 of an exemplary reaction mixture and an exemplary ball (an exemplary reaction mixture: an exemplary ball). An exemplary reaction mixture may be milled in an exemplary ball mill with a rotating speed of 250 rpm for 4 hours. An exemplary produced organoclay may have 37.4 Å layer distance after 4 hours of ball milling calculated from XRD data shown in FIG. 3.

Figure 3:
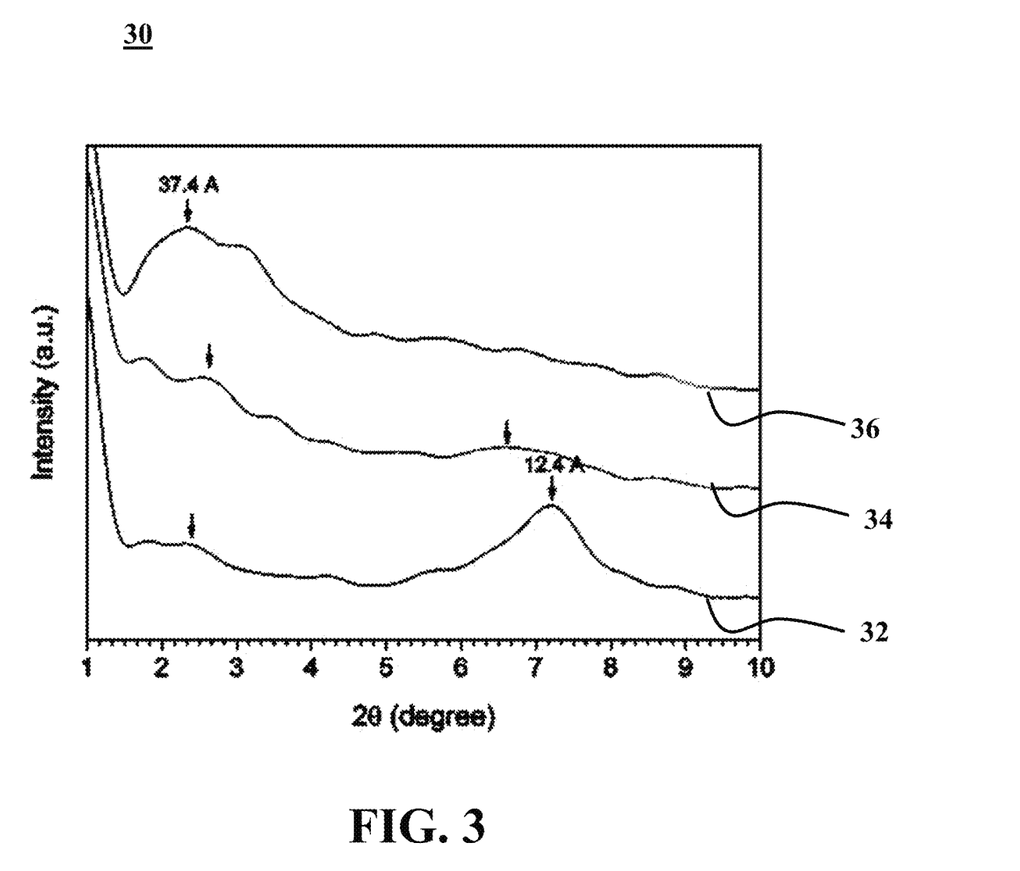
FIG. 3 illustrates X-ray diffraction patterns of produced organoclays after 30 minutes, 2 hours, and 4 hours of ball milling, consistent with one or more exemplary embodiments of the present disclosure.

FIG. 3 illustrates X-ray diffraction patterns 30 of produced organoclays after 30 minutes, 2 hours, and 4 hours of ball milling, consistent with one or more exemplary embodiments of the present disclosure. X-ray diffraction patterns 30 include X-ray diffraction pattern 32 of an exemplary organoclay after 30 minutes of ball milling, X-ray diffraction pattern 34 of an exemplary organoclay after 2 hours of ball milling, and X-ray diffraction pattern 36 of an exemplary organoclay after 4 hours of ball milling. As illustrated in FIG. 3 the molecules of an exemplary intercalating agent may gradually enter between clay sheets and consequently increase the platelet spacing.

Example 2: Pilot-Scale Production of Organoclays

In an exemplary embodiment, an organoclay may be produced by forming a reaction mixture using a synthesis method similar to method 100. An exemplary reaction mixture may be formed by adding 2.3851 Kg bentonite powder and 1.1149 Kg colophony in a ball mill such as a tumbler ball mill. An exemplary ball mill may contain steel balls with a diameter of 200 to 250 mm. An exemplary organoclay may be produced by adding an exemplary reaction mixture in an exemplary ball mill with a weight ratio of 1:15 and 1:30 of an exemplary reaction mixture and an exemplary ball (an exemplary reaction mixture: an exemplary ball). An exemplary reaction mixture may be milled in an exemplary ball mill with a rotating speed of 60 rpm for 24 hours. An exemplary produced organoclay may have 43.6 Å layer distance may be calculated from XRD data. Exemplary XRD diffraction patterns of an exemplary produced organoclay are shown in FIG. 4.

Figure 4:
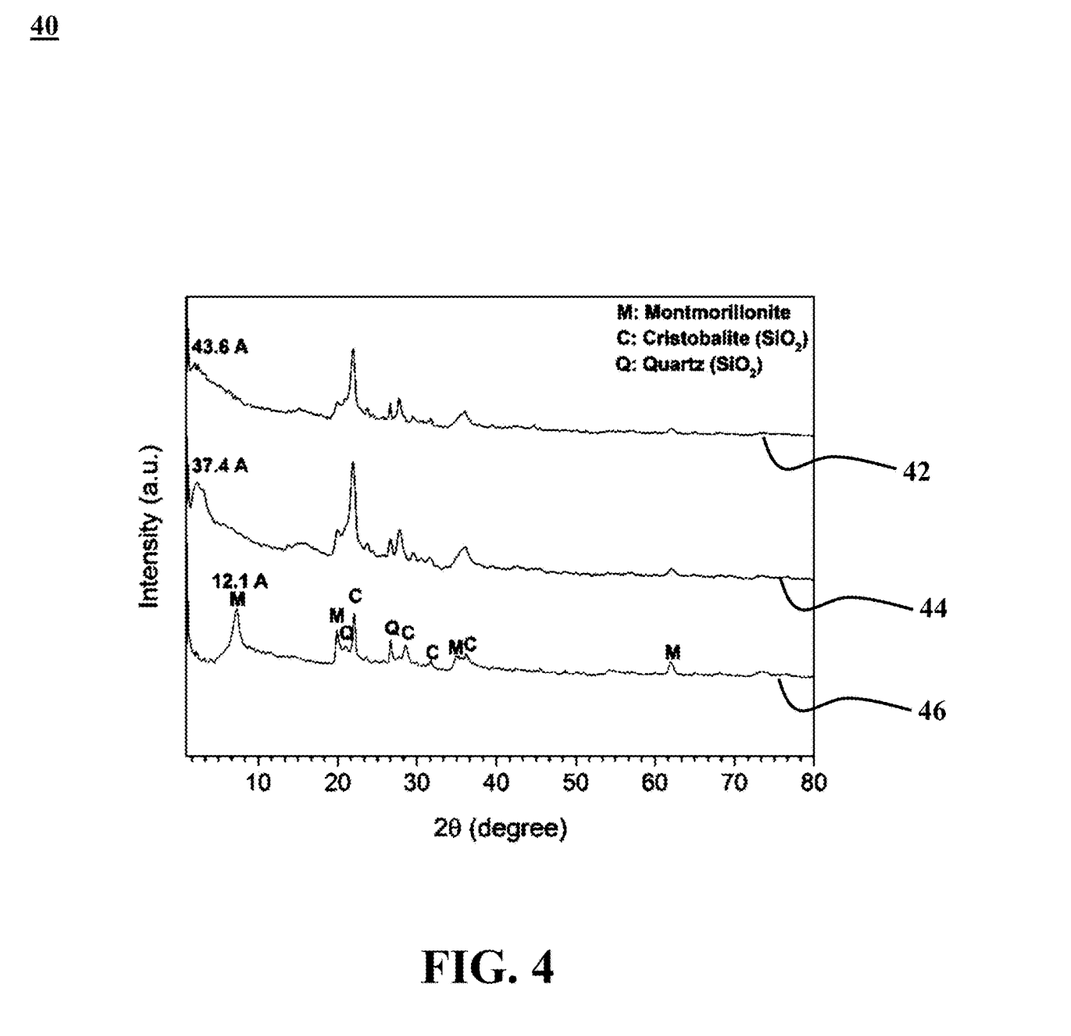
FIG. 4 illustrates X-ray diffraction patterns of produced organoclays utilizing colophony as an intercalating agent, consistent with one or more exemplary embodiments of the present disclosure.

FIG. 4 illustrates X-ray diffraction patterns 40 of produced organoclays utilizing colophony as an intercalating agent, consistent with one or more exemplary embodiments of the present disclosure. X-ray diffraction patterns 40 include X-ray diffraction pattern 42 of an exemplary organoclay synthesized in a pilot-scale process, X-ray diffraction pattern 44 of an exemplary organoclay synthesized in a laboratory-scale process, and an X-ray diffraction pattern 46 of clay. FIG. 4 shows the platelet spacing of 37.4 Å for a laboratory-scaled produced organoclay and 43.6 Å for a pilot-scaled produced organoclay.

Example 3: Laboratory-Scale Production of a Final Inner Liner Composition of a Tire (Sample A)

In an exemplary embodiment, a final inner liner composition of a tire may be produced by forming a final reaction mixture. To obtain an exemplary final reaction mixture, vulcanizing agents may be added to the masterbatch similar to method 106. To obtain an exemplary masterbatch, 262.5 g chlorobutyl rubber, 235.71 g natural rubber, 155.36 g synthetic rubber, 39.11 g reclaim rubber, 295 g carbon black, 30 g aromatic oil, 120.53 g calcium carbonate, 9.39 g colophony, 7.82 g stearic acid, 2.14 g magnesium oxide, 1.87 g tire gloss gel, 2.41 g phenolic antioxidant, 1.61 g n-isopropyl-n-phenyl-p-phenylenediamine, and 27.71 g organoclay may be added to a mixing chamber. An exemplary masterbatch may be mixed in an exemplary mixing chamber to discharge at a temperature range of 160° C. to 170° C. Afterwards, an exemplary masterbatch is left for 24 hours to release internal stresses. After releasing internal stresses, 4.94 g zinc oxide, 1.18 g 2-mercaptobenzothiazole disulfide, 1.11 g alkyl phenol polysulfide, 1.1 g sulfur, and 0.36 g n-cyclohexyl-2-benzothiazole sulfonamide may be added to 300 g of an exemplary masterbatch. An exemplary final reaction mixture may be mixed on a mill such as a laboratory two-roll mill for 10 minutes. An exemplary final reaction mixture may be allowed to release internal stresses for 24 hours. To produce a final inner liner composition of a tire an exemplary final reaction mixture may be cured at 145° C. under 110 bar pressure for 30 minutes.

Example 4: Laboratory-Scale Production of a Final Inner Liner Composition of a Tire (Sample B)

In an exemplary embodiment, a final inner liner composition of a tire may be produced by forming a final reaction mixture similar to method 106. To obtain an exemplary final reaction mixture, vulcanizing agents may be added to the masterbatch. To obtain an exemplary masterbatch, 262.5 g chlorobutyl rubber, 235.71 g natural rubber, 155.36 g synthetic rubber, 39.11 g reclaim rubber, 274.23 g carbon black, 30 g aromatic oil, 120.53 g calcium carbonate, 2.77 g colophony, 7.82 g stearic acid, 2.14 g magnesium oxide, 1.87 g tire gloss gel, 2.41 g phenolic antioxidant, 1.61 g n-isopropyl-n-phenyl-p-phenylenediamine, and 48.49 g organoclay may be added to a mixing chamber. An exemplary masterbatch may be mixed in an exemplary mixing chamber to discharge temperature at a temperature range of 160° C. to 170° C. Afterwards, an exemplary masterbatch is left for 24 hours to release internal stresses. After releasing internal stresses, 4.94 g zinc oxide, 1.18 g 2-mercaptobenzothiazole disulfide, 1.11 g alkyl phenol polysulfide, 1.1 g sulfur, and 0.36 g n-cyclohexyl-2-benzothiazole sulfonamide may be added to 300 g of an exemplary masterbatch. An exemplary final reaction mixture may be mixed on a mill such as a laboratory two-roll mill for 10 minutes. An exemplary final reaction mixture may be allowed to release internal stresses for 24 hours. To produce final inner liner composition of a tire, an exemplary final reaction mixture may be cured at 145° C. under 110 bar pressure for 30 minutes. An exemplary final inner liner composition of a tire may be thinned to 1.3 mm utilizing for example, a two-roll mill to be applied as a tire inner liner. An exemplary tire inner liner may be examined for air permeability. Air permeability results for final inner liner compositions of tires may indicate 41.9% reduction of air permeability for sample A and 21.7% for sample B.

Example 5: Pilot-Scale Production of a Final Inner Liner Composition of a Tire (Sample C)

In an exemplary embodiment, a final inner liner composition of a tire may be produced by forming a final reaction mixture. To obtain an exemplary final reaction mixture, vulcanizing agents may be added to a masterbatch. To form an exemplary masterbatch, 49 kg chlorobutyl rubber, 44 kg natural rubber, 29 kg synthetic rubber, 7.3 kg reclaim rubber, 55.06 kg carbon black, 5.60 kg aromatic oil, 22.50 kg calcium carbonate, 1.75 kg colophony, 1.46 kg stearic acid, 0.40 kg magnesium oxide, 0.35 kg tire gloss gel, 0.45 kg phenolic antioxidant, 0.30 kg n-isopropyl-n-phenyl-p-phenylenediamine, and 5.175 kg organoclay may be added to a mixing chamber. An exemplary masterbatch may be mixed in an exemplary mixing chamber for 5 minutes and discharged at a temperature range of 120° C. to 140° C. Afterwards, an exemplary masterbatch is left for 24 hours to release internal stresses. After releasing internal stresses, 3.6 kg zinc oxide, 1.161 kg 2-mercaptobenzothiazole disulfide, 0.81 kg alkyl phenol polysulfide, 1.08 kg sulfur, and 0.26 kg n-cyclohexyl-2-benzothiazole sulfonamide may be added to 218.7 kg of an exemplary masterbatch. An exemplary final reaction mixture may be mixed in an exemplary mixing chamber for 3 minutes. An exemplary final reaction mixture may be allowed to release internal stresses for 24 hours. To produce a final inner liner composition of a tire, an exemplary final reaction mixture may be cured at 145° C. under 110 bar pressure for 30 minutes. Physical and mechanical properties of exemplary samples A, B, and C may be shown in Table 1.

TABLE 1

| Properties | Sample A | Sample B | Sample C |
|---|---|---|---|
| Tensile strength (%) | 4.5 | 2.76 | 16.26 |
| Elongation (%) | 8.72 | 2.62 | 3.9 |
| Modulus 300% (%) | −11.57 | 4.6 | <1 |
| Tear Resistance (%) | 15.59 | −7.06 | 3.57 |
| Resilience (%) | <1 | 11.67 | <1 |
| Hardness (%) | <1 | <1 | 1.9 |
| Viscosity reduction (%) | 10.08 | 19.96 | 23.21 |
| Scorch time (%) | 4.29 | 2.86 | 3.7 |

Example 6: Production of Tires Using the Organoclay-Modified Inner Liner Composition In an exemplary embodiment, a final inner liner composition may be produced by forming a final reaction mixture. To obtain an exemplary final reaction mixture, vulcanizing agents may be added to a masterbatch. To obtain an exemplary masterbatch, 49 kg chlorobutyl rubber, 44 kg natural rubber, 29 kg synthetic rubber, 7.3 kg reclaim rubber, 55.06 kg carbon black, 5.60 kg aromatic oil, 22.50 kg calcium carbonate, 1.75 kg colophony, 1.46 kg stearic acid, 0.40 kg magnesium oxide, 0.35 kg tire gloss gel, 0.45 kg phenolic antioxidant, 0.30 kg n-isopropyl-n-phenyl-p-phenylenediamine, and 5.175 kg organoclay may be added to a mixing chamber. An exemplary masterbatch may be mixed in an exemplary mixing chamber for 5 minutes to discharge temperature at a temperature range of 120° C. to 140° C. Afterwards, the masterbatch is left for 24 hours to release internal stresses. After releasing internal stresses, 3.6 kg zinc oxide, 1.161 kg 2-mercaptobenzothiazole, 0.81 kg alkyl phenol polysulfide, 1.08 kg sulfur, and 0.26 kg n-cyclohexyl-2-benzothiazole sulfonamide may be added to 218.7 kg of an exemplary masterbatch. An exemplary final reaction mixture may be mixed in an exemplary mixing chamber for 3 minutes. An exemplary final inner liner composition of a tire may be thinned to 1.3 mm utilizing for example, a calendar machine to be applied as the most interior layer during fabrication of tires. To produce a raw finalized tire, other layers of a tire such as carcass plies, beads, sidewalls, crown plies, and treads are placed on an exemplary produced inner liner composition of a tire. The raw finalized tire was molded and cured at 185° C. under 110 bar pressure for 10 minutes. 100 tires were prepared using the organoclay-modified inner liner composition. Low pressure endurance, fatigue, high speed test, and tire road test after 25000 Km for the organoclay-modified tires may be studied on the produced tires. Results may show improvements of 1%, 12%, 18.9%, and 33% for exemplary low-pressure endurance, fatigue, high speed, and tire road after 25000 Km tests, respectively.

Example 7: Production of an Organoclay-Modified Rubber

In an exemplary embodiment, an organoclay-modified rubber composition may be prepared by adding an organoclay to a mixture of rubbers. An exemplary mixture of rubbers may include chlorobutyl rubber, natural rubber, synthetic rubber, and reclaim rubber. An exemplary organoclay may be prepared by mixing and milling bentonite powder and an intercalating agent in a ball mill. To obtain an exemplary organoclay-modified rubber composition, 109.37 g chlorobutyl rubber, 98.21 g natural rubber, 64.73 g synthetic rubber, 16.29 g reclaim rubber may be mixed on a laboratory two-roll mill for 20 minutes. 11.54 g of an exemplary organoclay may be added to rubbers on a two-roll mill.

Figure 5:
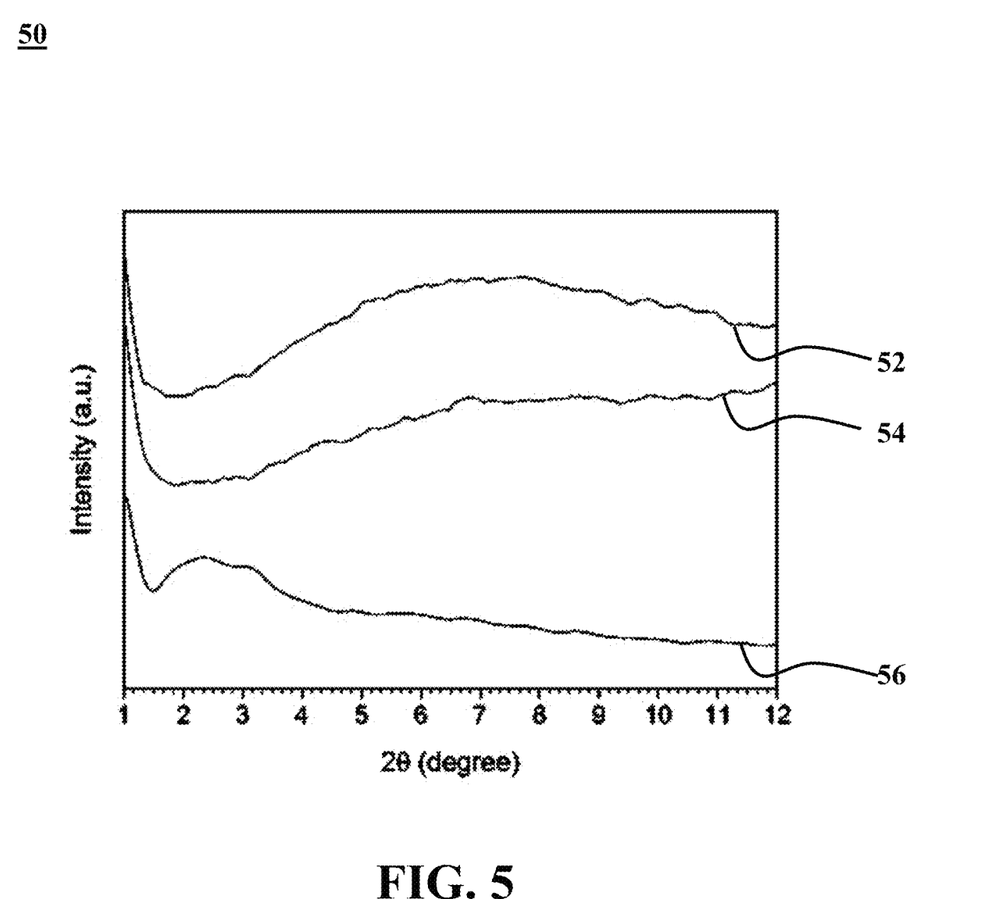
FIG. 5 illustrates X-ray diffraction patterns of an organoclay, a mixture of rubbers, and a final inner liner composition of a tire produced by an organoclay and a mixture of rubbers, consistent with one or more exemplary embodiments of the present disclosure.

FIG. 5 illustrates X-ray diffraction patterns 50 of an organoclay, a mixture of rubbers, and an organoclay-modified rubber produced by an organoclay and a mixture of rubbers, consistent with one or more exemplary embodiments of the present disclosure. An exemplary mixture of rubbers may include chlorobutyl rubber, natural rubber, synthetic rubber, and reclaim rubber. X-ray diffraction patterns 50 include X-ray diffraction patterns 52 of an exemplary an organoclay-modified rubber produced by a mixture of an exemplary polymer-compatible organoclay and an exemplary mixture of rubbers, X-ray diffraction patterns 54 of an exemplary mixture of rubbers with no polymer-compatible organoclay, and X-ray diffraction patterns 56 of an exemplary synthesized polymer-compatible organoclay produced by method 100.

XRD pattern 52 in FIG. 5 may show no peak for an exemplary organoclay, when compared to the X-ray diffraction pattern 56. This may confirm the exfoliation of an exemplary organoclay into the exemplary inner liner composition.

Figure 6:
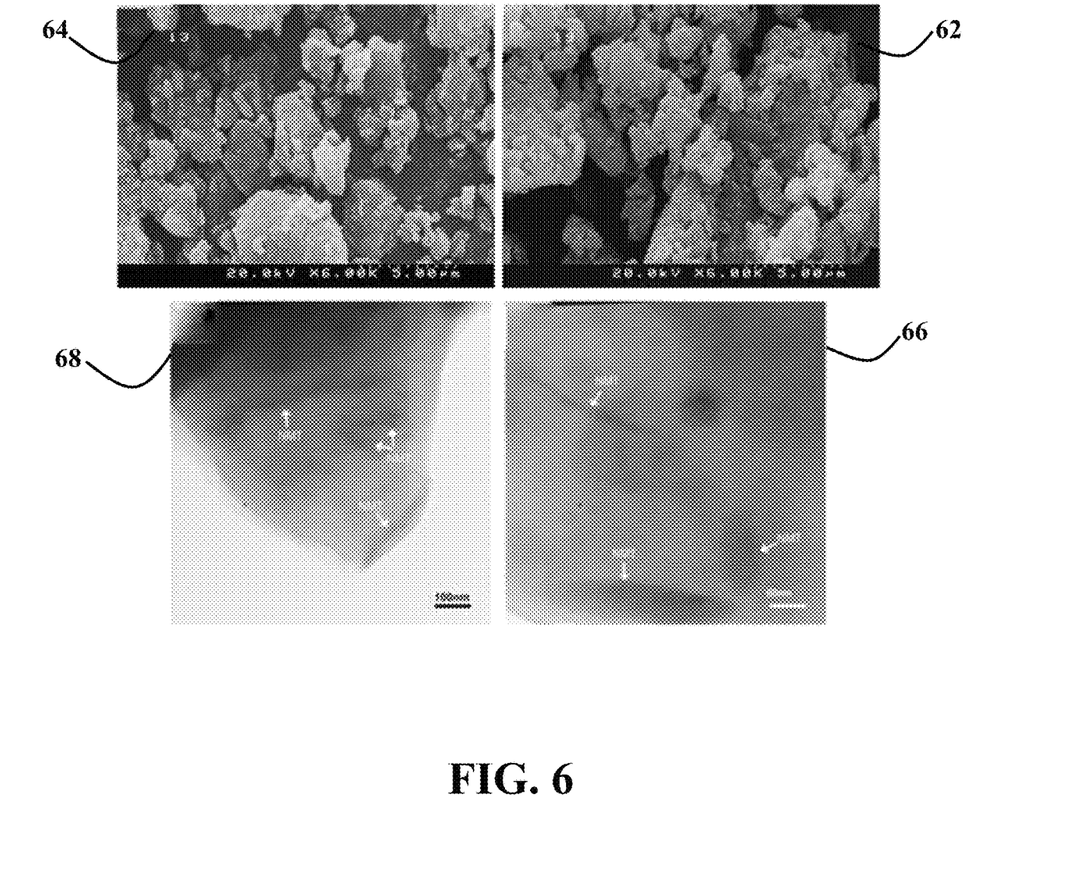
FIG. 6 illustrates transmission electron microscopy images of an organoclay-modified rubber composition and field emission scanning electron microscopy images of a powdered organoclay, consistent with one or more exemplary embodiments of the present disclosure.

FIG. 6 illustrates transmission electron microscopy images of an organoclay-modified rubber composition and field emission scanning electron microscopy images of a powdered organoclay produced by method 100, consistent with one or more exemplary embodiments of the present disclosure. In an exemplary embodiment, field emission scanning electron microscopy image 62 of a pilot-scale produced organoclay, field emission scanning electron microscopy image 64 of a laboratory-scale produced organoclay, and transmission electron microscopy images 66 and 68 of an organoclay-modified rubber composition at various magnifications produced by an exemplary organoclay and an exemplary mixture of rubbers. Transmission electron microscopy and field emission scanning electron microscopy images in FIG. 6 may show exfoliated organoclays in an exemplary mixture of rubbers and morphology of an exemplary powdered organoclay respectively.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic; e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A method for producing a clay/polymer composite comprising a clay added to a polymer matrix, the method comprising:
choosing an intercalating agent from among organic constituents of the polymer matrix, wherein the constituents of the polymer matrix comprise at least one of a natural or synthetic rubber, a tackifier, a filler, a softener, and an antioxidant, the tackifier comprising colophony;
forming a polymer-compatible organoclay by mixing and milling the intercalating agent and the clay with a weight ratio of between 1:0.42 and 1:0.66 (clay powder:intercalating agent), wherein an average particle size of the polymer-compatible organoclay is between 0.2 μm and 10 μm; and
adding the polymer-compatible organoclay to the polymer matrix by mixing the polymer-compatible organoclay and the constituents of the polymer matrix with the polymer-compatible organoclay concentration between 3 and 5 parts per hundred rubber (PHR).

2. A method for producing a clay/polymer composite comprising a clay added to a polymer matrix, the method comprising:
choosing an intercalating agent from among constituents of the polymer matrix;
forming a polymer-compatible organoclay by mixing and milling the intercalating agent with the clay; and
adding the polymer-compatible organoclay to the polymer matrix.

3. The method of claim 2, wherein forming the polymer-compatible organoclay comprises:
mixing and milling the clay powder and the intercalating agent with a weight ratio of between 1:0.42 and 1:0.66 (clay powder:intercalating agent).

4. The method of claim 3, wherein forming the polymer-compatible organoclay comprises mixing and milling the clay and the intercalating agent into a fine powder with an average particle size between 0.2 μm and 10 μm.

5. The method of claim 3, wherein mixing and milling the clay and the intercalating agent comprises solvent-free ball milling a clay/intercalating agent mixture comprising the clay and the intercalating agent utilizing a ball mill, the ball mill comprising a plurality of balls, wherein a weight ratio of the clay/intercalating agent mixture to the plurality of balls is between 1:15 and 1:30 (clay/intercalating agent mixture:plurality of balls).

6. The method of claim 5, wherein solvent-free ball milling the clay/intercalating agent mixture comprises milling the clay/intercalating agent mixture in the ball mill for a time period between 4 hours and 36 hours.

7. The method of claim 6, wherein solvent-free ball milling the clay/intercalating agent mixture comprises milling the clay/intercalating agent mixture in the ball mill, the ball mill comprising a rotating ball mill rotating at a rotational speed between 60 rpm and 250 rpm.

8. The method of claim 5, wherein solvent-free ball milling the clay/intercalating agent mixture comprises milling the clay/intercalating agent mixture into a fine powder with an average particle size between 0.2 μm and 10 μm.

9. The method of claim 8, wherein solvent-free ball milling the clay/intercalating agent mixture comprises grinding the clay/intercalating agent mixture in the ball mill, the ball mill comprising a rotating ball mill rotating at a rotational speed between 60 rpm and 250 rpm.

10. The method of claim 3, wherein the constituents of the polymer matrix comprise at least one of a natural or synthetic rubber, a tackifier, a filler, and a softener.

11. The method of claim 10, wherein choosing the intercalating agent from among the constituents of the polymer matrix comprises choosing colophony as the intercalating agent.

12. The method of claim 11, wherein forming a polymer-compatible organoclay comprises mixing and milling the intercalating agent and the clay, the clay comprising bentonite.

13. The method of claim 12, wherein adding the polymer-compatible organoclay to the polymer matrix comprises:
    forming a masterbatch by mixing the polymer-compatible organoclay and the constituents of the polymer matrix;
    mixing a vulcanizing agent with the masterbatch; and
    curing the mixture of the vulcanizing agent and the masterbatch.

14. The method of claim 13, wherein mixing the polymer-compatible organoclay and the constituents of the polymer matrix comprises mixing the polymer-compatible organoclay and the constituents of the polymer matrix with the polymer-compatible organoclay concentration between 3 and 5 parts per hundred rubber (PHR).

15. The method of claim 14, wherein curing the mixture of the vulcanizing agent and the masterbatch comprises heating the mixture of the vulcanizing agent and the masterbatch at a temperature of 145° C. to 185° C. and under a pressure of 100 to 120 bar for 10 to 30 minutes.

16. The method of claim 15, wherein mixing the vulcanizing agent with the masterbatch comprises mixing at least one of sulfur, peroxides, metal oxides, acetoxy silane, and urethane crosslinkers as the vulcanizing agent with the masterbatch.

\* \* \* \* \*